United States Patent [19]
Töpker et al.

[11] Patent Number: 5,887,938
[45] Date of Patent: Mar. 30, 1999

[54] SIDE IMPACT BEAM FOR A PASSENGER VEHICLE

[75] Inventors: Dieter Töpker, Paderborn; Werner Böhmer, Willebadessen; Ludger Gehringhoff, Paderborn, all of Germany

[73] Assignee: Benteler AG, Paderborn, Germany

[21] Appl. No.: 966,207

[22] Filed: Nov. 7, 1997

[30] Foreign Application Priority Data

Nov. 15, 1996 [DE] Germany .............................. 196473340

[51] Int. Cl.⁶ ....................................................... B06J 5/00
[52] U.S. Cl. ......................................... 296/188; 296/146.6
[58] Field of Search ................................ 296/188, 146.6; 49/502

[56] References Cited

U.S. PATENT DOCUMENTS

| | | | |
|---|---|---|---|
| 4,861,097 | 8/1989 | Wycech | 296/188 |
| 5,314,228 | 5/1994 | Figge, Sr. | 296/146.6 |
| 5,600,931 | 2/1997 | Jonsson | 296/146.6 X |
| 5,692,797 | 12/1997 | Dancasiu | 296/188 |

FOREIGN PATENT DOCUMENTS 2425338  7/1979  France .

Primary Examiner—Joseph D. Pape
Attorney, Agent, or Firm—Friedrich Keuffner

[57] ABSTRACT

A side impact beam for a passenger vehicle, particularly for a vehicle door, includes a hat-shaped profiled section which is open toward the external panelling of the passenger vehicle and has at least one web facing away from the external panelling, two legs connected to the web and directed toward the external panelling and two flanges connected to the ends of the legs and facing away from each other, wherein, starting from the transverse plane in the middle of the beam, the height of the profiled section decreases continuously toward the ends of the beam provided with increased width flanges serving for securing the beam to the vehicle chassis. The height of the profiled section may decrease in accordance with a uniform or non-uniform curve pattern.

7 Claims, 2 Drawing Sheets

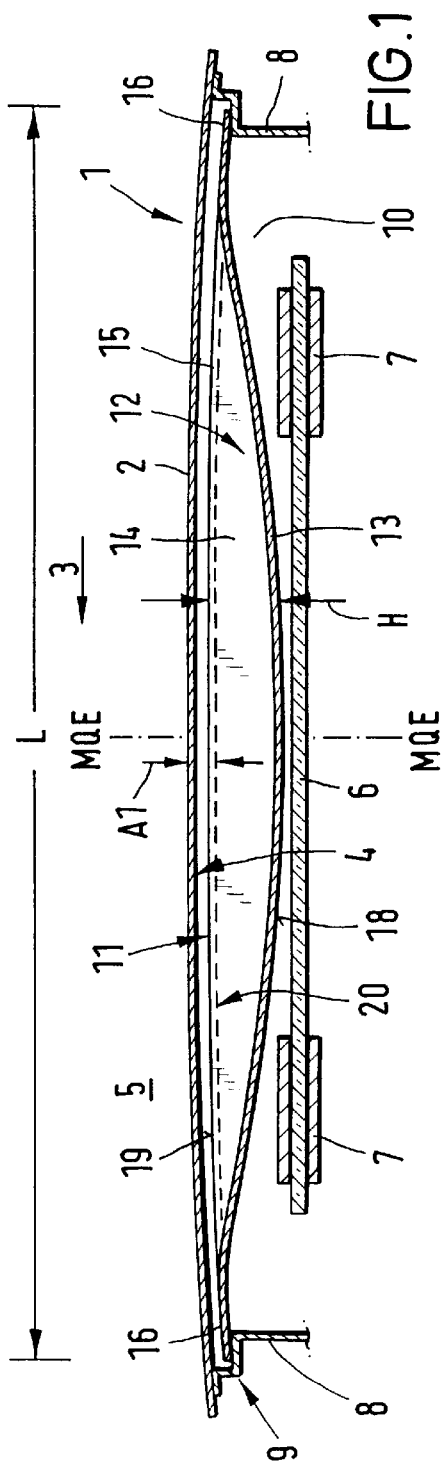
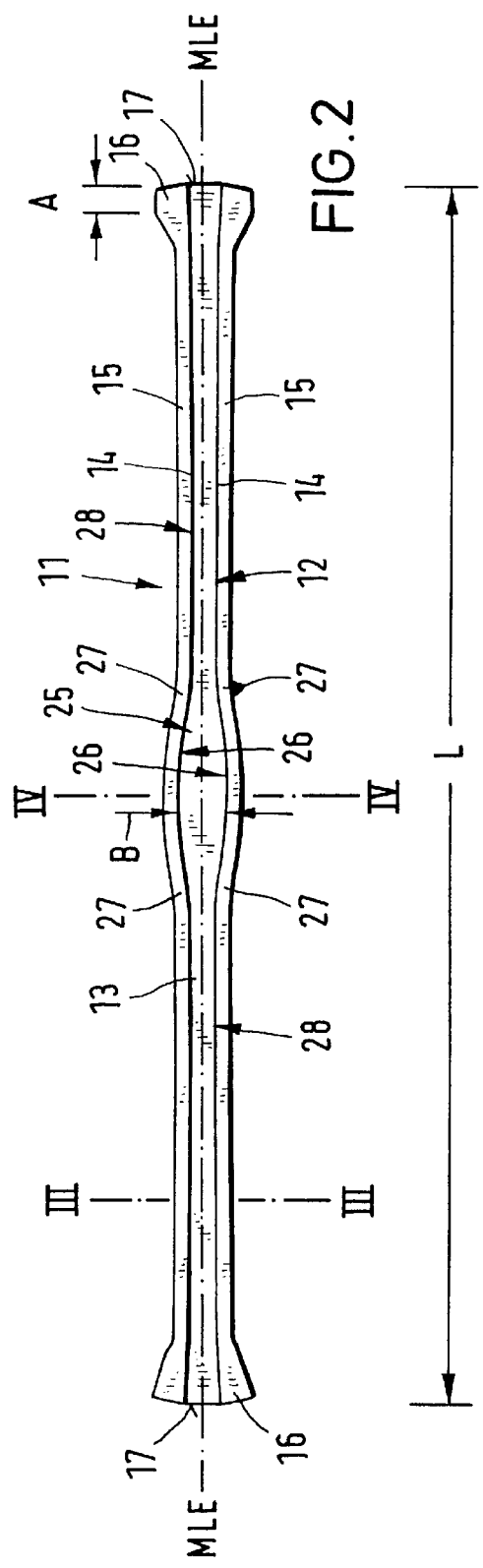

SIDE IMPACT BEAM FOR A PASSENGER VEHICLE

BACKGROUND OF THE INVENTION

1. Field of the Invention

The present invention relates to a side impact beam for a passenger vehicle, particularly for a vehicle door.

2. Description of the Related Art

Side impact beams composed of hat-shaped profile sections which are open toward the external panelling of a passenger vehicle, particularly the external panelling of a vehicle door, have been found to be preferred door reinforcements because of their high stiffness, their good deformability and high sectional stability in the case of concentric loads.

Because of practical requirements, when a concentric load is applied to side impact beams, approximately the same bending stresses should occur along its entire length. Consequently, in the ideal case, the section modulus would have to linearly decrease from a maximum in a center transverse plane usually located in the middle of the door toward the points where the side impact beam is fastened to the vehicle chassis, particularly at the A-crosstie, B-crosstie and C-crosstie of the vehicle chassis. However, side impact beams constructed in this manner do not have a sufficient stiffness because they resiliently yield too much in the elastic range. On the other hand, side impact beams having a maximum constant section modulus along its entire length have a high stiffness in the elastic range but they buckle prematurely.

In a side impact beam known from PCT/SE 93/00760 with a hat-shaped cross-sectional profile, the resistance is to be ensured by providing the side impact beam with at least one beam portion in which the width of the web decreases in the direction toward a beam end, while the cross-sectional height remains essentially constant. In addition, at least one additional beam portion is provided in which the height decreases in the direction toward the beam end, while the width of the web remains essentially constant. This configuration of the side impact beam is not sufficiently able to meet the criteria expected of such a side impact beam.

SUMMARY OF THE INVENTION

Therefore, it is the primary object of the present invention to provide a side impact beam which, in the case of a side impact crash, has an optimum deformation behavior while requiring as little material as possible, and taking into consideration the particular mounting situations in vehicle doors due to the presence of the windows and the lifting mechanisms therefor.

In accordance with the present invention, the hat-shaped profiled section which is open toward the external panelling of the passenger vehicle has at least one web facing away from the external panelling, two legs connected to the web and directed toward the external panelling and two flanges connected to the ends of the legs and facing away from each other, wherein, starting from the transverse plane in the middle of the beam, the height of the profiled section decreases continuously toward the ends of the beam provided with increased width flanges serving for securing the beam to the vehicle chassis. The height of the profiled section may decrease in accordance with a uniform or non-uniform curve pattern.

In particular, the steady reduction of the height of the section is achieved particularly according to a parabola-shaped curve or a similar curve. This type of decrease of the height of the section is suitable in a particularly advantageous manner for the assembly situation in vehicle doors. These assembly situations result primarily due to the windows in the vehicle doors and the lifting mechanisms for the windows. While the greatest distance to the external panelling exists in the transverse plane in the middle of the windows, this distance decreases toward the ends of the window as a result of the lifting mechanisms. Accordingly, the maximum available assembly space between the lifting mechanisms, the window and the external panelling of the vehicle door can be utilized for the configuration of the side impact beam.

The invention has been found equally advantageous in side impact beams which have only one web and two legs or those which have two webs and a total of four legs and the corresponding number of flanges. Particularly in the configuration mentioned last, i.e., the so-called multiple hat-sections, the heights of the legs of the profiled sections extending next to each other may vary or may also be arranged offset next to each other, in order to utilize the available assembly space in an optimum manner.

The decrease of the height of the profiled section starting from the transverse plane in the middle of the section can be such that the height zero is reached only exactly at an end face of the beam or at both end faces of the beam. At these ends, flanges having a sufficient width are then available next to the legs for securing the side impact beam to the vehicle chassis. This configuration produces an optimum stiffness with the smallest possible plane surfaces for securing the beam ends. However, it is also conceivable that the configuration is such that the height zero is reached only shortly in front of the end faces of the beam.

Since, for reasons of stiffness, the external panelling of a vehicle door usually is arched toward the outside as seen in longitudinal direction of the vehicle, another feature of the present invention provides that the surfaces of the profiled section adjacent the arched external panelling correspond to the arched curvature of the external panelling. The surfaces in question usually are the surfaces of the flanges. Consequently, in this ideal embodiment, the side impact beam does not have a straight section portion either on the side facing the external panelling nor on the side facing away from the external panelling.

In accordance with another embodiment of the present invention, the profiled section has section end portions and a section middle portion between the end portions, wherein the transitions between the section end portions and the middle portion are curved, and wherein the width of the middle portion is convexly increased toward both sides relative to the longitudinal center plane of the profiled section. This feature is advantageous for optimizing the stability behavior of the so-called hat-profiled sections. Consequently, the side impact beam has its greatest width in the middle portion of the section. As a rule, the width is achieved by an appropriate dimensioning of the web of the profiled section. The width of the flanges usually remains the same. The maximum width again is in the transverse plane in the middle of the section which is located approximately in the middle of the door and then decreases in the directions toward the ends of the section. The length of the convexly expanded middle section portion of the side impact beam may be a third of the total length of the side impact or may also be somewhat shorter. The transitions of the convexly widened section portion extend tangentially into the adjacent section portions. By means of these tangential transitions, opening of the profiled section is shifted toward higher loads.

In order to maintain a residual section modulus particularly of simple hat-shaped sections even after the section opens up, another feature of the present invention provides that, in a middle section portion, the length portions of the flanges adjacent the longitudinal edges of the flanges are bent by about 90° into the direction of the legs and the transitions from the legs to the web have a radius of curvature which is approximately equal to half the inside width between the legs. The bent longitudinal portions of the flanges may extend parallel to the legs. Consequently, the bent length portion of the flanges and the comparatively large transition radii from the legs to the web determine the residual section height after buckling of the side impact beam. The middle section portion constructed in this manner preferably has a length which corresponds approximately to one third the length of the side impact beam.

The thickness of the sheet steel of which the side impact beam is manufactured may be constant over the entire length in all parts thereof. However, in accordance with a more advantageous feature, the thickness of the steel sheet in the middle portion of the section is greater than the thickness in the two section end portions adjacent both sides of the middle portion. In this manner, the stability behavior of the hat-shaped profiled section can be even further optimized.

In this connection, a preferred embodiment provides that the thickness of the steel sheet in the middle section portion is approximately one sixth greater than the thickness in the two section end portions.

For example, if the initial plates used for manufacturing the side impact beam have a thickness of 1.8 mm, this thickness may be reduced in the section end portions by stretching to a thickness of 1.5 mm. In that case, the middle section portion having a greater thickness has a length which corresponds to about one third to half the entire length of the side impact beam.

Also conceivable is an embodiment in which the thickness of the initial plates decreases continuously from the transverse plane in the middle of the beam toward the ends of the beam. In that case, the side impact beam may have a thickness of about 2 mm in the middle and a thickness of about 1 mm at the ends of the beam.

Finally, the deformation behavior of the side impact beam can be additionally optimized if, in accordance with another development of the present invention, a steel having the following chemical analysis in % by weight is used:

| | |
|---|---|
| C: | 0.19–0.25 |
| Si: | 0.15–0.50 |
| Mn: | 1.10–1.40 |
| P: | max. 0.025 |
| S: | max. 0.015 |
| Cr: | max. 0.35 |
| Mo: | max. 0.35 |
| Ti: | 0.020–0.050 |
| B: | 0.002–0.005 |
| Al: | 0.02–0.06 |

By cooling the geometry of the structural component in a specified manner in closed tools, a tempering structure having the following mechanical properties is achieved:

yield point 1,100N/mm$^2$ tensile strength 1,450N/mm$^2$ elongation 8%.

The tempered material is characterized by a very high strength and a sufficient ductility. In addition, the material has good welding and enamelling properties.

In the case of the section geometries described above, the use of this steel means that the sections can absorb very high stresses in the elastic range before they plasticize. Consequently, the energy absorption is greater by a multiple than in soft steel.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a schematic horizontal sectional view of a door of a passenger vehicle equipped with a side impact beam;

FIG. 2 is a top view of the side impact beam of FIG. 1;

DESCRIPTION OF THE PREFERRED EMBODIMENTS

Figure 3:
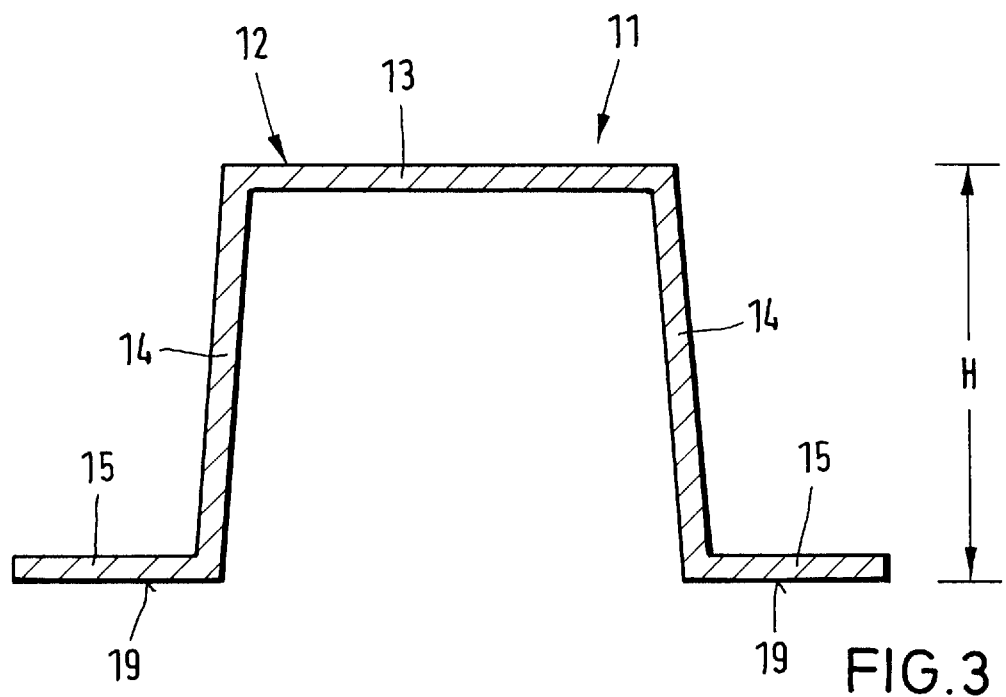
FIG. 3 is a vertical sectional view, on a larger scale, taken along sectional line III—III of FIG. 2.

FIG. 1 of the drawing schematically shows a vehicle door 1 for a passenger vehicle. The external panelling 2 of the door 1 is arched slightly toward the outside 5 in accordance with curvature 4.

A window 6 which can be raised and lowered is mounted in the vehicle door 1 at a distance from the external panelling 2. Lifting mechanisms 7 for the window 6 are schematically shown at the ends of the window 6.

FIG. 1 further shows two crossties 8 of a vehicle chassis 9, which is otherwise not illustrated in detail.

In the mounting space 10 formed by the external panelling 2, the crossties 8, the window 6 and the lifting mechanisms 7, an appropriately configured side impact beam 11 is mounted.

When considering FIGS. 1–3 together, it is apparent that the side impact beam 11 is composed of a hat-shaped profiled section 12 of sheet steel which is open toward the external panelling 2 of the vehicle. The profiled section 12 includes a web 13 facing away from the external panelling 2, two legs 14 directed toward the external panelling 2 and connected to the web 13, and two flanges 15 connected to the ends of the legs 14, wherein the flanges 15 face away from each other.

At the ends 16 of the profiled section 12 serving for securing the side impact beam 11 to the crosstie 8, the flanges 15 are widened, as is shown in FIG. 2.

As FIG. 1 further shows, the height H of the profiled section 12 decreases continuously starting from the transverse plane MQE in the direction toward the ends 16 in accordance with a parabola-shaped curve. As FIG. 2 shows at the right end 16 of the profiled section, zero height H of the profiled section 12 may be located at a distance A from the end face 17 of the end 16, or, as illustrated at the left end 16 in FIG. 2, zero height H may be located in the end face 17.

Consequently, due to the parabola-shaped curve pattern 18 as seen in FIG. 1, the mounting space 10 between the external panelling 2, the crossties 8, the window 6 and the lifting mechanisms 7 can be utilized in an optimum manner in such a way that the section modulus of the side impact beam 11 decreases from a maximum in the transverse plane MQE toward the ends 16 of the beam 11.

As can also be seen in FIG. 1, the shape 20 of the surfaces 19 of the profiled section 12 adjacent the curved external panelling 2 is adapted to this curvature 4. In other words, the same distance Al exists between the external panelling 2 and the surfaces 19 over the entire length L of the side impact beam 11. The surfaces 19 are those of the flanges 15.

Figure 4:
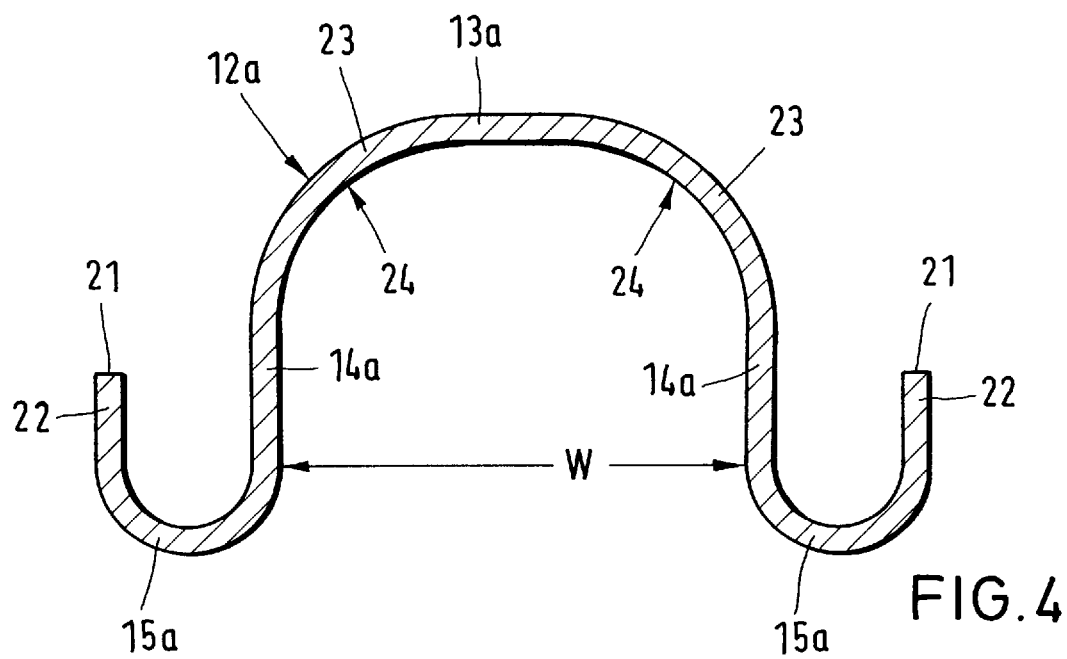
FIG. 4 is a vertical sectional view, on a larger scale, taken along sectional line IV—IV of FIG. 2.

The side impact beam 11 may have over its entire length L the profiled section 12 illustrated in FIG. 3. However, in order to maintain a residual section modulus after a side impact crash has opened the profiled section 12, the embodiment of the profiled section 12a of FIG. 4 provides that a section portion corresponding approximately to a third of the length L of the side impact beam 11 has flanges 15a which are bent relative to the portions 22 adjacent the longitudinal edges 21 by about 90° in the direction toward the legs 14a. This section portion is located in the middle of the side impact beam 11 in the longitudinal direction thereof. Consequently, the length portions 22 extend approximately parallel to the legs 14a. FIG. 4 further shows that the transitions 23 from the legs 14a to the web 13a have a radius of curvature 24 in this area which corresponds approximately to half the inside width W between the legs 14a.

Moreover, as shown in FIG. 2, a section portion 25 located in the middle of the side impact beam 11 in longitudinal direction may have a convexly widened width B toward both sides relative to the longitudinal center plane over approximately a third or less of the length L of the side impact beam 11. This convex widening of the section portions 25 preferably is with a radius of curvature 26, wherein the transitions 27 are tangential from the section portion 25 to the adjacent section portions 28.

In the section portion 25 in the middle of the beam 11 in longitudinal direction, extending approximately over half to one third of the length of the side impact beam 11, the steel sheet of which the section 12 is manufactured preferably has a thickness of 1.8 mm. In the adjacent section portions 28 toward the ends 16 of the beam 11, the thickness of the sheet steel is 1.5 mm.

The steel of which the side impact beam 11 is manufactures has the following chemical analysis in % by weight:

| | |
|---|---|
| C: | 0.19–0.25 |
| Si: | 0.15–0.50 |
| Mn: | 1.10–1.40 |
| P: | max. 0.025 |
| S: | max. 0.015 |
| Cr: | max. 0.35 |
| Mo: | max. 0.35 |
| Ti: | 0.020–0.050 |
| B: | 0.002–0.005 |
| Al: | 0.02–0.06 |

While specific embodiments of the invention have been shown and described in detail to illustrate the inventive principles, it will be understood that the invention may be embodied otherwise without departing from such principles.

We claim:

1. A side impact beam for a passenger vehicle, the passenger vehicle having an external panelling, the side impact beam comprising a hat-shaped profiled section of sheet steel open toward the external panelling, the profiled section comprising at least one web facing away from the external panelling, legs connected to the at least one web and directed toward the external panelling, and two flanges connected to ends of the legs and facing away from each other, the profiled section having a height, the side impact beam having ends, the height of the profiled section decreasing continuously from a transverse center plane toward the ends of the beam, wherein the flanges at the ends of the beam have increased widths for attaching the beam to a vehicle chassis, wherein the profiled section has section end portions and a section middle portion between the section end portions, the section middle portion being convexly arched toward both sides relative to a longitudinal center plane of the profiled section, further comprising curved transitions between the section middle portion and the section end portions, wherein the flanges of the section middle portion are bent by about 90° toward the legs, and wherein transitions between the legs and the web have a radius of curvature which is approximately equal to half an inside width between the legs.

2. The side impact beam according to claim 1, wherein the height of the profiled section decreases in accordance with a uniform curve pattern.

3. The side impact beam according to claim 1, wherein the height of the profiled section decreases in accordance with a non-uniform curve pattern.

4. The side impact beam according to claim 1, wherein the external panelling is curved in a longitudinal direction of the vehicle in accordance with a curvature, and wherein surfaces of the profiled section adjacent the external panelling have a curvature which corresponds to the curvature of the external panelling.

5. The side impact beam according to claim 1, wherein the steel sheet of the profiled section has in a the section middle portion a thickness which is greater than a thickness of section end portions located adjacent the section middle portion.

6. The side impact beam according to claim 5, wherein the thickness of the steel sheet in the section middle portion is about one sixth greater than the thickness in the section end portions.

7. The side impact beam according to claim 1, wherein the side impact is of a steel having the following chemical analysis in % weight:.

| | |
|---|---|
| C: | 0.19–0.25 |
| Si: | 0.15–0.50 |
| Mn: | 1.10–1.40 |
| P: | max. 0.025 |
| S: | max. 0.015 |
| Cr: | max. 0.35 |
| Mo: | max. 0.35 |
| Ti: | 0.020–0.050 |
| B: | 0.002–0.005 |
| Al: | 0.02–0.06 |

* * * * *